United States Patent [19]
Rudd

[11] Patent Number: 4,554,836
[45] Date of Patent: Nov. 26, 1985

[54] LASER VIBROMETER

[75] Inventor: Michael J. Rudd, Concord, Mass.

[73] Assignee: The United States of America as represented by the Secretary of the Navy, Washington, D.C.

[21] Appl. No.: 645,888

[22] Filed: Aug. 31, 1984

[51] Int. Cl.⁴ ............................................. G01B 9/02
[52] U.S. Cl. ................................................... 73/657
[58] Field of Search ................. 73/655, 657; 356/349; 367/178

[56] References Cited

U.S. PATENT DOCUMENTS

| | | | |
|---|---|---|---|
| 3,471,238 | 10/1969 | Hawke | 356/349 |
| 3,523,735 | 4/1970 | Taylor | 356/349 |
| 3,782,176 | 1/1974 | Jacobs | 73/657 |
| 3,978,713 | 9/1976 | Penney | 73/627 |
| 4,123,167 | 10/1978 | Botcherby et al. | 356/152 |
| 4,322,829 | 3/1982 | Davis, Jr. et al. | 367/178 |
| 4,526,465 | 7/1985 | Corti et al. | 73/657 X |

Primary Examiner—Jerry W. Myracle
Attorney, Agent, or Firm—Robert F. Beers; Henry Hansen; Vincent T. Pace

[57] ABSTRACT

Optical interferometric apparatus for detecting and measuring discontinuities in structural materials from ultrasonic stress waves at their surfaces. The apparatus includes an acousto-optic (a/o) modulator which shifts a portion of a laser beam in frequency, producing a modulated beam of light. This modulated light beam is deflected and passes through an adjustable lens to the surface being measured. The light scattered by the surface is focused by the lens on an end mirror of the laser which produced the original beam, and is divergingly reflected therefrom. The reflected, scattered light is heterodyned with the unshifted portion of the laser beam in a photodiode to produce a phase modulated signal at the acoustic frequency of the a/o modulator. Surface displacement can be measured as a function of instantaneous phase shift, and surface velocity as a function of rate of change of phase shift.

8 Claims, 3 Drawing Figures

LASER VIBROMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to ultrasonic transducers and more particularly to a laser driven, interferometric optical transducer for measuring ultrasonic vibration on an object surface.

The measurement of material surface discontinuities has traditionally been accomplished by using piezoelectric transducers to measure ultrasonic surface vibration induced in the material. However, in many applications the wavelength of the ultrasound is substantially smaller than the diameter of the transducer. For example, when the ultrasound frequency is 10 MHz, its wavelength is about 0.5 mm, while the typical transducer may be 12 mm in diameter. This size differential makes the transducer very directional.

Piezoelectric transducers, even if small enough to overcome the directionality problem, are contact coupled to the surface being measured. Often, an impedance matching material is interposed between the transducer and the surface being measured in order to obtain proper impedance matching.

Furthermore, piezoelectric transducers are not easily calibrated. Usually some secondary device must be employed in order to obtain proper calibration.

One solution to these problems is to use an optical transducer. Such transducers can have very small diameters, and since they are essentially massless, they have very small impedance. A laser beam properly focused on a surface may be used as an ultrasonic detector. An additional advantage of a laser ultrasonic detector is that it can be scanned across a surface by simply moving a mirror.

SUMMARY OF THE INVENTION

Accordingly, it is an object of this invention to detect surface discontinuities by measuring ultrasonic vibration on an object surface.

Another object of this invention is to provide an optical transducer for measuring ultrasonic vibration on a material surface.

A further object of this invention is to provide a focusable and scannable laser beam for use as an optical, ultrasonic transducer.

A still further object of this invention is to detect ultrasonic vibration from phase modulations of a laser beam.

Yet another object of this invention is to measure ultrasonic vibration amplitude and frequency by laser interferometric techniques.

The above and other objects are realized in a laser vibrometer capable of measuring very small amplitude, high-frequency vibrations. The laser vibrometer comprises an optical heterodyne interferometer, wheren light scattered from a vibrating surface is caused to interfere with a reference beam. The scattered light has been shifted in frequency from the reference beam by an acoustic-optic modulator. This shifted or modulated beam has a carrier frequency of about 40 MHz. The amplitude of the surface vibration is determined by measuring the phase modulation of the shifted beam relative to the reference or unshifted beam. The two beams are heterodyned in a photoelectric device which outputs an electrical analog signal whose phase modulation is proportional to the vibration displacement.

Other advantages and novel features of the invention will become apparent from the detailed description of the invention which follows the drawings wherein:

DETAILED DESCRIPTION OF THE INVENTION

Figure 1:
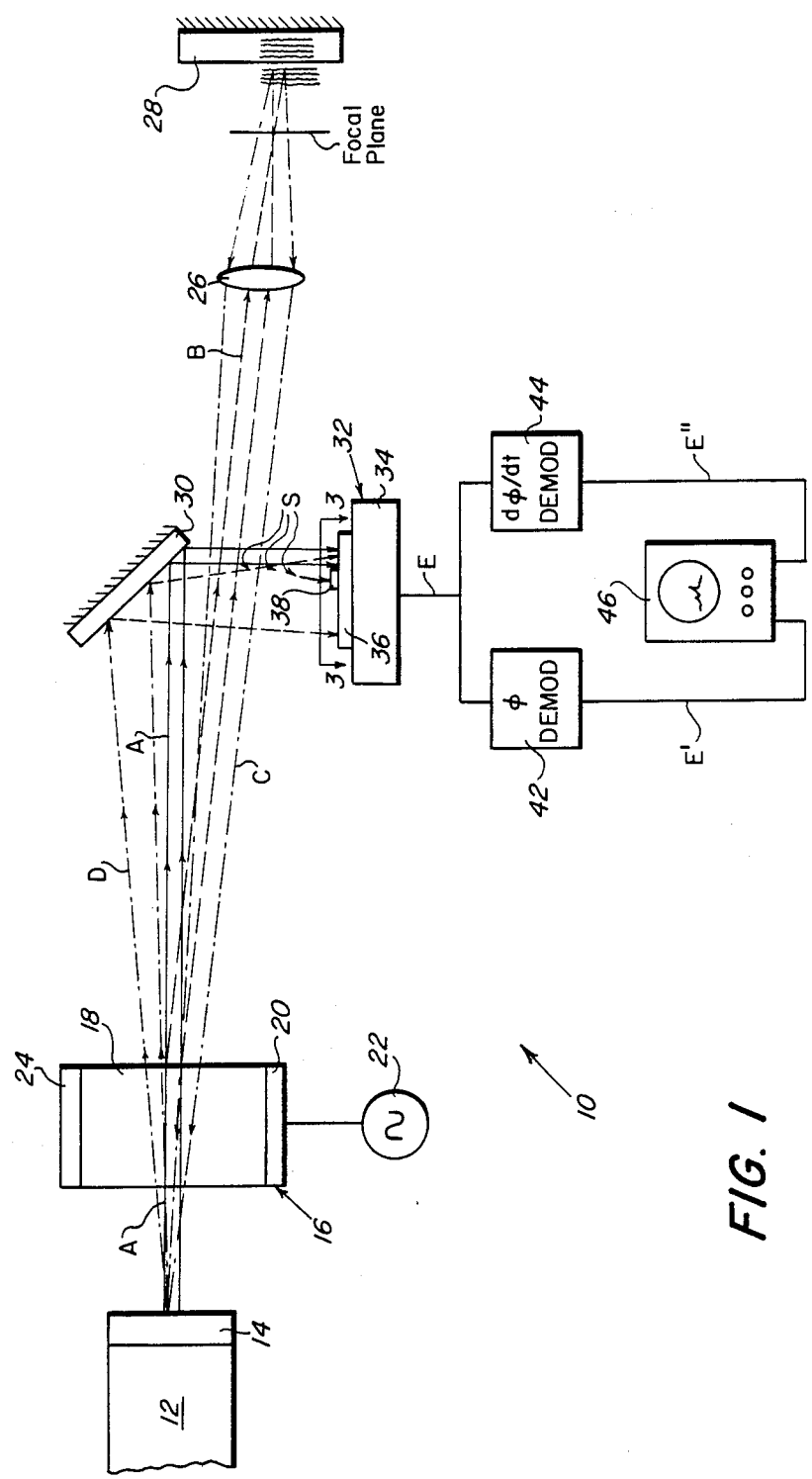
FIG. 1 shows an embodiment of a laser vibrometer according to the invention.

Referring now to the drawings wherein like reference numerals designate identical or corresponding parts among the several views, and more particularly to FIG. 1, there is shown generally a laser vibrometer 10. A laser 12 has an end mirror 14 at its emitting end. Laser 12 would generally be a conventional, low power gas laser, such as a helium-neon laser, having a bandwidth in the range from 1 to 10 MHz. A narrow (e.g. 1 mm) diameter beam A is propagated by laser 12.

An acoustic-optic modulator or Bragg cell 16 is disposed in the path of beam A. The Bragg cell 16 may be mounted directly on the emitting end of laser 12. The Bragg cell 16 includes an acoustic medium 18, a transducer 20 coupled to one side of the acoustic medium 18, a signal generator 22 connected for driving the transducer 20, and an acoustic absorber 24. Acoustic medium 18 generally consists of an isotropic, transparent, homogeneous material such as quartz, but it could also consist of a column of water. The signal generator 22 is capable of producing a highly stable sinusoidal signal having a frequency of about 40 MHz.

Figure 2:
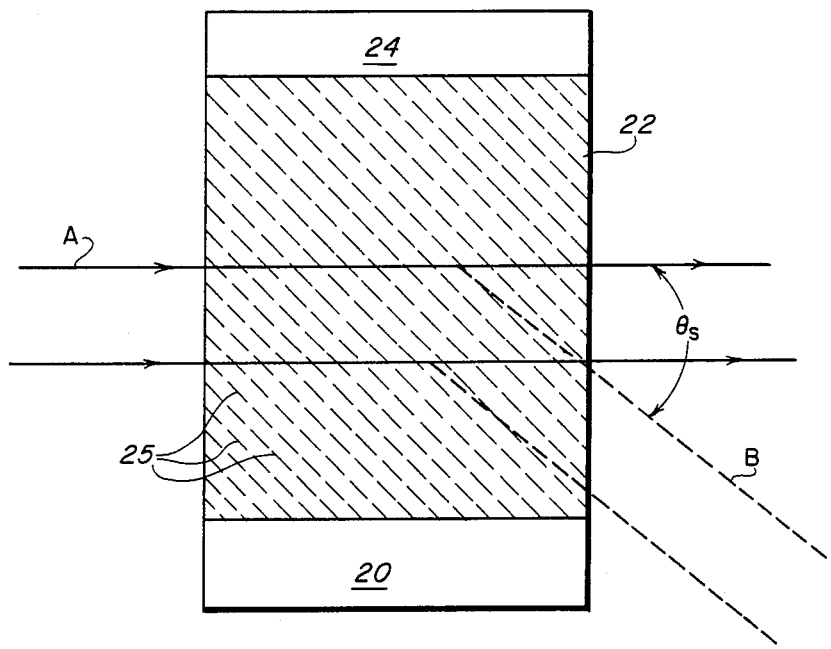
FIG. 2 shows operative features of an acousto-optic modulator used in the embodiment shown in FIG. 1.

Referring now to FIG. 2, transducer 20 is excited by the signal from generator 22, and in turn, propagates sonic waves 25 of the same frequency in the acoustic medium 18. The acoustic absorber 24 is disposed at the opposite end of acoustic medium 18 to prevent reflection of the sonic waves 24. In this manner a standing acoustic stress wave or pattern is produced in acoustic medium 18.

Upon entering the Bragg cell 16 light beam A is partially deflected by the stress pattern which acts as a diffraction grating, as shown in FIG. 2. The deflected beam B is also shifted in frequency by an amount equal to the frequency of the sonic waves. Beam B emanates from the Bragg cell 16 at an angle $\theta_s$ relative to the undeflected portion of beam A. Also, beam B is modulated at the frequency of the sonic waves (i.e. 40 MHz). It is well known that the angle $\theta_s$ can be determined from the relationship:

$$\sin \theta_s = \frac{\lambda_l}{2\lambda_s n} \quad (1)$$

where $\lambda_l$ is the wavelength of the incident light beam, $\lambda_s$ is the wavelength of the sonic waves in the acoustic medium 18, and n is an integer. Thus, the amount of deflection of beam B can be adjusted by varying the frequency of the sonic waves, since $\lambda_s = c/f_s$, where c is the velocity of sound in the acoustic medium 18.

The proportion of the optical energy of beam A which may be deflected in order to render the laser vibrometer 10 operable is within the range of 5 to 95%.

Referring back to FIG. 1, a focusing lens 26 is disposed in the path of beam B, ahead of the object surface 28 being measured. Lens 26 may be a microscope objective lens and is adjustable along the optical axis of beam B. Generally, lens 26 is positioned such that its focal plane is just ahead of the surface 28. In this way light which is scattered by surface 28 is collected and focused back on the laser end mirror 14, thereby imaging surface 28 on laser end mirror 14. The distance from the laser end mirror 14 to the surface 28 should be an integral number of laser cavity lengths to ensure that all of the laser cavity modes are in phase. This also maximizes the optical signal strength of the system. This focused light beam C is not at the proper angle to be deflected by the Bragg cell 16. Consequently, it passes through the Bragg cell 16 unaltered and forms a focused image of the surface 28 on the laser end mirror 14.

Beam C is reflected off laser end mirror 14 and, as Beam D, again passes through Bragg cell 16. Beam D is also not at the proper angle to be deflected by the Bragg cell 16, so it also passes through unaltered. Beam D diverges slightly as it travels from laser end mirror 14. It is now traveling in the same general direction as the undeflected, unshifted portion of beam A, which serves as a reference.

Figure 3:
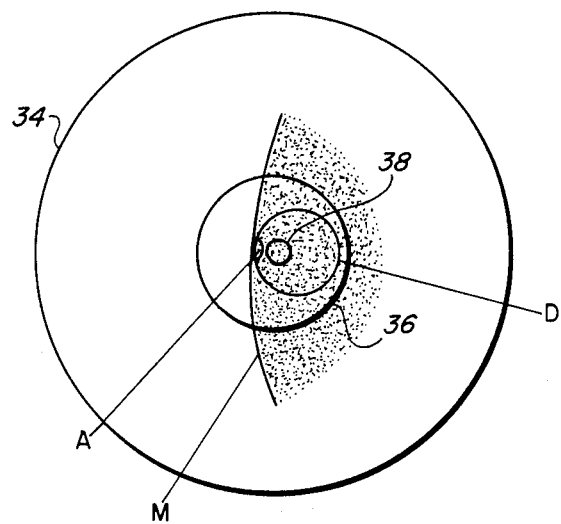
FIG. 3 shows the preferred alignment of the light beams incident on a photodetector as viewed along line 3—3 of FIG. 1.

A mirror 30 or other reflecting means is disposed in the paths of beams A and D. Beams A and D are deflected by mirror 30 onto a photodetector 32. As can be seen in FIG. 1 and FIG. 3, beams A and D intersect as they impinge on the photodetector 32. The two beams A and D are heterodyned in the photodetector 32 to produce an electrical signal E having a frequency equal to the shift frequency (40 MHz) induced by the Bragg cell 16.

As shown in FIG. 3, photodetector 32 has a housing 34 for electronic circuitry, and a photodiode 36 mounted atop the housing 34. The photodiode 36, such as a silicon avalanche photodiode, has a photosensitive region 38. It has been determined that the optimum position for the photodiode 36 is with the photosensitive region 38 just to one side of the undeflected beam A. Beam D, the reflected scattered light, is incident on a fairly broad area surrounding region 38 and intersects with beam A. The shaded area M represents the shadow cast by the mirror 30 giving an indication of how the mirror 30 should be positioned relative to photodiode 36.

Due to this arrangement it is stray light, as indicated by the arrows S in FIG. 1, from beam A which actually impinges on the photosensitive region 38 along with beam D. This offset arrangement tends to equalize the intensities of the incident beams and prevents saturation of the photodiode 36.

Ultrasonic vibration on surface 28 causes the phase of the light incident on its, beam B, to vary. Consequently, beams C and D contain these phase variations or modulations. Accordingly, signal E, the output of photodetector 32, is phase modulated in the same manner.

The amount of instantaneous phase change $\Delta\phi$ can be represented by the relation:

$$\Delta\phi = \frac{2\pi d}{\lambda_l}, \quad (2)$$

where d is the physical displacement of surface 28 due to ultrasonic vibration, and $\lambda_l$ is the wavelength of the light incident on surface 28. The displacement d is indicative of the amplitude of ultrasonic vibration on surface 28. Thus a phase demodulator 42 tuned to the acoustic modulation frequency, e.g. 40 MHz and connected to photodetector 32 will produce an analog signal E' which is indicative of the actual displacement of vibrating surface 28.

Similarly, the rate of phase change in the light beams C and D, and consequently electrical signal E, will give an indication of the velocity of the ultrasonic vibrations on surface 28. Accordingly, a phase/frequency demodulator 44, also tuned to the acoustic modulation frequency and connected to photodetector 32, will generate an analog signal E'' which is indicative of the velocity of surface 28.

A visual display and/or recording device 46 such as an oscilloscope or minicomputer may be connected to phase demodulator 42 and phase/frequency demodulator 44 for displaying or storing the ultrasonic vibration amplitude and velocity information contained in signals E' and E'' respectively.

Some of the many advantages and features of the disclosed invention should how be apparent in view of the foregoing description. For example, a novel device has been described for detecting and measuring ultrasonic vibration on an object surface in order to detect surface discontinuities. This device comprises a laser vibrometer which generates an optical transducer or laser beam for measuring the ultrasonic vibration. The ultrasonic vibration phase modulates a frequency shifted laser beam. This phase modulated beam is then caused to interfere with or heterodyne with an unshifted, unmodulated reference beam in a photoelectric device. The output of the photoelectric device can be phase and phase/frequency demodulated to determine the amplitude and velocity of the ultrasonic vibration on the object surface.

Numerous modifications and variations of the subject invention are possible in view of the above teachings. It is to be understood therefore, that within the scope of the appended claims, the invention may be practiced otherwise than as specifically described herein.

What is claimed is:

1. Apparatus for interferometrically measuring ultrasonic vibration on an object surface comprising:
   means for propagating a beam of monochromatic light, said propagating means having a mirror at its emitting end;
   light modulating means disposed in the path of the light beam for frequency shifting a portion thereof such that the frequency shifted portion is deflected toward the object surface to be measured;
   adjustable means disposed in the path of the deflected beam portion for directing only the frequency shifted beam portion onto the object surface being measured and for focusing the reflected portion of the light scattered by the surface onto the end mirror of said propagating means from which it is divergingly reflected; and
   photoelectric means disposed in the paths of both the divergingly reflected light beam and the unshifted portion of the propagated light beam and responsive to both said beams, for generating a phase modulated electrical signal indicative of the amplitude and velocity of ultrasonic vibration on the object surface.

2. Apparatus as recited in claim 1 wherein said light beam propagating means comprises a laser.

3. Apparatus as recited in claim 2 wherein said light modulating means comprises an acousto-optic modulator.

4. Apparatus as recited in claim 3 wherein said adjustable directing means comprises an optical lens.

5. Apparatus as recited in claim 4 wherein said photoelectric means comprises:
reflecting means for intercepting and deflecting the divergingly reflected light beam and the unshifted portion of the propagated light beam; and
a photo-diode formed to receive the deflected beams from said reflecting means for generating an electrical signal proportional thereto.

6. Apparatus as recited in claim 5 wherein:
the photodiode has a centrally located photosensitive region; and
the reflecting means is oriented such that the unshifted portion of the propagated light beam is incident on the photodiode just to one side of said photosensitive region.

7. Apparatus as recited in claim 6 further comprising:
means for phase-demodulating the electrical signal generated by said photodiode, whereby the amplitude of ultrasonic surface vibrations may be determined; and
means for detecting the rate of change of phase in the electrical signal from said photodiode, whereby the velocity of ultrasonic surface vibrations may be determined.

8. Apparatus for interferometrically measuring ultrasonic vibration on an object surface comprising:
a laser formed for propogating a beam of light, said laser having a mirror at its emitting end;
an acousto-optic modulator disposed in the path of the light beam, said modulator being formed to shift the frequency of a portion of the light beam such that the frequency shifted portion is deflected in the direction of the object surface to be measured;
an adjustable microscope objective lens disposed in the path of the frequency shifted beam for directing said frequency shifted beam onto the object surface, and for focusing the reflected portion of the light scattered by the surface onto the end mirror of said laser such that it is divergingly reflected therefrom;
a planar mirror operatively disposed for intercepting both the unshifted portion of the original laser beam and the divergingly reflected beam, said planar mirror being oriented for deflecting both of the intercepted beams;
a photodiode formed to be responsive to the unshifted laser beam and the divergingly reflected beam for generating an electrical signal proportional thereto;
a phase demodulator responsive to the electrical signal from said photodiode for determining phase shifts in the electrical signal whereby the amplitude of ultrasonic surface vibrations may be determined; and
a phase/frequency demodulator also responsive to the electrical signal from said photodiode for determining the rate of change of phase shifts in the signal, whereby the velocity of ultrasonic surface vibrations may be determined.

* * * * *